US011747579B2

(12) United States Patent
Green et al.

(10) Patent No.: US 11,747,579 B2
(45) Date of Patent: Sep. 5, 2023

(54) OPTICAL COMPONENT ARRAY DEVICES

(71) Applicant: II-VI DELAWARE, INC., Wilmington, DE (US)

(72) Inventors: Eric T. Green, Corning, NY (US); Bradley Dailey, Painted Post, NY (US); Aravanan Gurusami, Morgan Hill, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 343 days.

(21) Appl. No.: 16/909,739

(22) Filed: Jun. 23, 2020

(65) Prior Publication Data

US 2021/0396942 A1 Dec. 23, 2021

(51) Int. Cl.
*G02B 6/42* (2006.01)

(52) U.S. Cl.
CPC ............ *G02B 6/423* (2013.01); *G02B 6/426* (2013.01); *G02B 6/4212* (2013.01); *G02B 6/4236* (2013.01); *G02B 6/4249* (2013.01)

(58) Field of Classification Search
CPC .... G02B 6/423; G02B 6/4212; G02B 6/4236; G02B 6/4249; G02B 6/426

USPC .......................................................... 385/14
See application file for complete search history.

(56) References Cited

U.S. PATENT DOCUMENTS

| 2003/0113071 A1* | 6/2003 | Kim ..................... G02B 6/4249 385/76 |
| 2006/0093303 A1* | 5/2006 | Reagan ................ G02B 6/4457 385/76 |

\* cited by examiner

*Primary Examiner* — Jerry M Blevins
(74) *Attorney, Agent, or Firm* — Blank Rome LLP (57) ABSTRACT

The present disclosure generally relates to devices, which may be used in communication or optoelectronic modules for example, suitable for arrayed positioning of a plurality of fiber optical components. In one form, an optoelectronic module includes a printed circuit board (PCB) and at least one optical component array device including an array of laterally or radially spaced receptacles configured to receive an optical component. One or more of the receptacles includes a fused fiber optical component positioned therein. A recursive fiber may extend between an output of a first fused fiber optical component and an input of a second fused fiber optical component, and an optical fiber routing member may be coupled to the PCB and include a plurality of guides extending away from the PCB and defining a pathway for routing optical fibers relative to the PCB.

20 Claims, 12 Drawing Sheets

OPTICAL COMPONENT ARRAY DEVICES

FIELD

The present disclosure generally relates to organization and arrangement of optical components which may be used in communication modules, including for example optoelectronic modules. More particularly, but not exclusively, the present disclosure relates to devices suitable for arrayed positioning of a plurality of optical components such as fused fiber optical components.

BACKGROUND

Unless otherwise indicated herein, the materials described herein are not prior art to the claims in the present application and are not admitted to be prior art by inclusion in this section.

Communication modules, including optoelectronic modules such as optical or amplifier line cards, may include various components that engage in the transmission and reception of optical signals. Some of the components may be housed within a shell of the communication module. The communication module itself may be operably received within a host device that serves as one component of a communications network, operably coupled to one or more fiber optic cables which include one or more optical fibers, or both. The communication module may include a transmit port, a receive port, or both, each of which is configured to receive a connector of the optical fiber.

Some communication modules, such as optical or amplifier line cards, may include a large number of optical components which may consume a significant portion of the interior volume of the housing of the communication module or require an increase in the size of the housing. In addition, the large number of optical components which may be present in certain modules may, for example, present challenges positioning these components relative to one another and organizing various optical fibers associated therewith. As a result, assembly of optoelectronic modules of this nature may become complicated and require stocking a large volume of individual optical components having different functionalities. These modules may also require a larger number of optical fiber splices between optical components of sequential functions, and these splices may result in increased manufacturing costs and potentially lead to decreased reliability or increased loss. Thus, there remains a need for additional contributions in this technology.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, an optoelectronic module includes a printed circuit board ("PCB") that extends between opposite ends and includes one or more electrical or optical connectors at one or both ends thereof. The module also includes an optical component array device that includes an elongate body configured to position a plurality of fused fiber optical components relative to the PCB in an array of laterally or radially spaced receptacles.

In another embodiment, an optical component array device includes an elongated cylindrical body that extends between a first end and an opposite second end. The device also includes a plurality of receptacles radially spaced around an outer circumference of the elongated cylindrical body. One or more of the receptacles is defined by an elongate slot that extends between and opens at the first and second ends of the elongated cylindrical body, and one of the receptacles is configured to receive a fused fiber optical component.

In yet another embodiment, an optical component array device includes an elongate body that extends along a longitudinal axis between a first end and an opposite second end and olaterally between a first side and an oppositely positioned second side. The device also includes a plurality of receptacles laterally spaced from one another and positioned between the first and second sides of the elongate body, and one of the receptacles is configured to receive a fused fiber optical component. A cover member is positioned over the elongate body and configured to cooperate with the elongate body to receive therebetween the fused fiber optical component.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to organization and arrangement of optical components which may be used in communication modules, including for example optoelectronic modules. More particularly, but not exclusively, the present disclosure relates to devices suitable for arrayed positioning of a plurality of optical components such as fused fiber optical components. Although the embodiments are described in the context of optoelectronic modules used in the field of optical networking, embodiments disclosed herein may be employed in other fields or operating environments where the functionality disclosed herein may be useful. Accordingly, the scope of the invention should not be construed to be limited to the example implementations and operating environments disclosed herein.

With general reference to FIGS. 1-4, there is illustrated an example embodiment of an optical component array device 10. As will be descried in greater detail below, device 10 houses and provides a radial array of a plurality of optical components which may, for example, be fused fiber optical components. Device 10 includes an elongate body 12 having a generally cylindrical configuration which extends along a longitudinal axis L between a first end 14 and an opposite second end 16. While the cylindrical configuration of body 12 has a generally circular cross-sectional shape in the illustrated form, it is contemplated that the cross-sectional shape of body 12 could be oval or rectangular, just to provide a few examples, in other non-illustrated forms. Body 12 includes a plurality of receptacles 18, 20, 22 and 24 in the form of elongated slots which extend between and open at first end 14 and second end 16 of body 12. Body 12 may include one or more less, or additional, receptacles or elongated slots relative to the illustrated form.

Each of receptacles 18, 20, 22 and 24, as viewed from first end 14 of body 12 for example, includes a generally U-shaped configuration. More particularly, with reference to the elongated slot of receptacle 18 for example, it includes a first surface 26 positioned opposite of a second surface 28 which generally extends in-line with first surface 26. First surface 26 and second surface 28 extend from outer surface 30 along the circumference of body 12 to a third surface 32 which generally extends transversely to and between first surface 26 and second surface 28. In this configuration, each of receptacles 18, 20, 22 and 24 opens at the circumference of body 12 so that an optical component may be positioned therein. As an alternative configuration, one or more of receptacles 18, 20, 22 and 24 may be covered along outer surface 30 such that an optical component is positioned therein from first end 14 or second end 16 of body 12. One or more of receptacles 18, 20, 22 and 24 may also have, for example, a V-shaped or C-shaped configuration, just to provide a few examples.

As indicated above, each of receptacles 18, 20, 22 and 24 opens through outer surface 30 along the circumference of body 12. Receptacles 18, 20, 22 and 24 are spaced from one another along the circumference of body 12 such that receptacles 18, 20, 22 and 24 are arranged in a radial array on body 12. As illustrated, receptacles 18, 20, 22 and 24 are evenly spaced from one another. However, forms in which the spacing between receptacles 18, 20, 22 and 24 varies are also possible.

Device 10 includes optical components 34, 36, 38 and 40 which are positioned in receptacles 18, 20, 22 and 24, respectively. While each of receptacles 18, 20, 22 and 24 includes an optical component in the illustrated form, forms in which an optical component is positioned in only some of receptacles 18, 20, 22 and 24 are also possible. Optical components 34, 36, 38 and 40 respectively include input ends 42, 44, 46, and 48 and output ends 50, 52, 54 and 56. In the illustrated form, each of output ends 50, 52, 54, and 56 includes a pair of outputs which may be coupled to a respective optical fiber, although it is also possible that one or more of output ends 50, 52, 54, and 56 may include a single output which may be coupled to a respective optical fiber. Each of input ends 42, 44, 46, and 48 includes a single input, although one or more of input ends 42, 44, 46 and 48 may include more than one input.

When optical components 34, 36, 38 and 40 are positioned in receptacles 18, 20, 22 and 24 of body 12, input ends 42, 44, 46, and 48 extend past second end 16 of body 12, and output ends 50, 52, 54, and 56 extend past first end 14 of body 12. In some forms, one or more or each of optical components 34, 36, 38 and 40 may be a fused fiber optical component which includes a fused fiber coupling region where light may be exchanged between optical fibers. In these forms, the fused fiber coupling region may be positioned in receptacles 18, 20, 22 and 24 between first end 14 and second end 16 of body 12.

Figure 1:
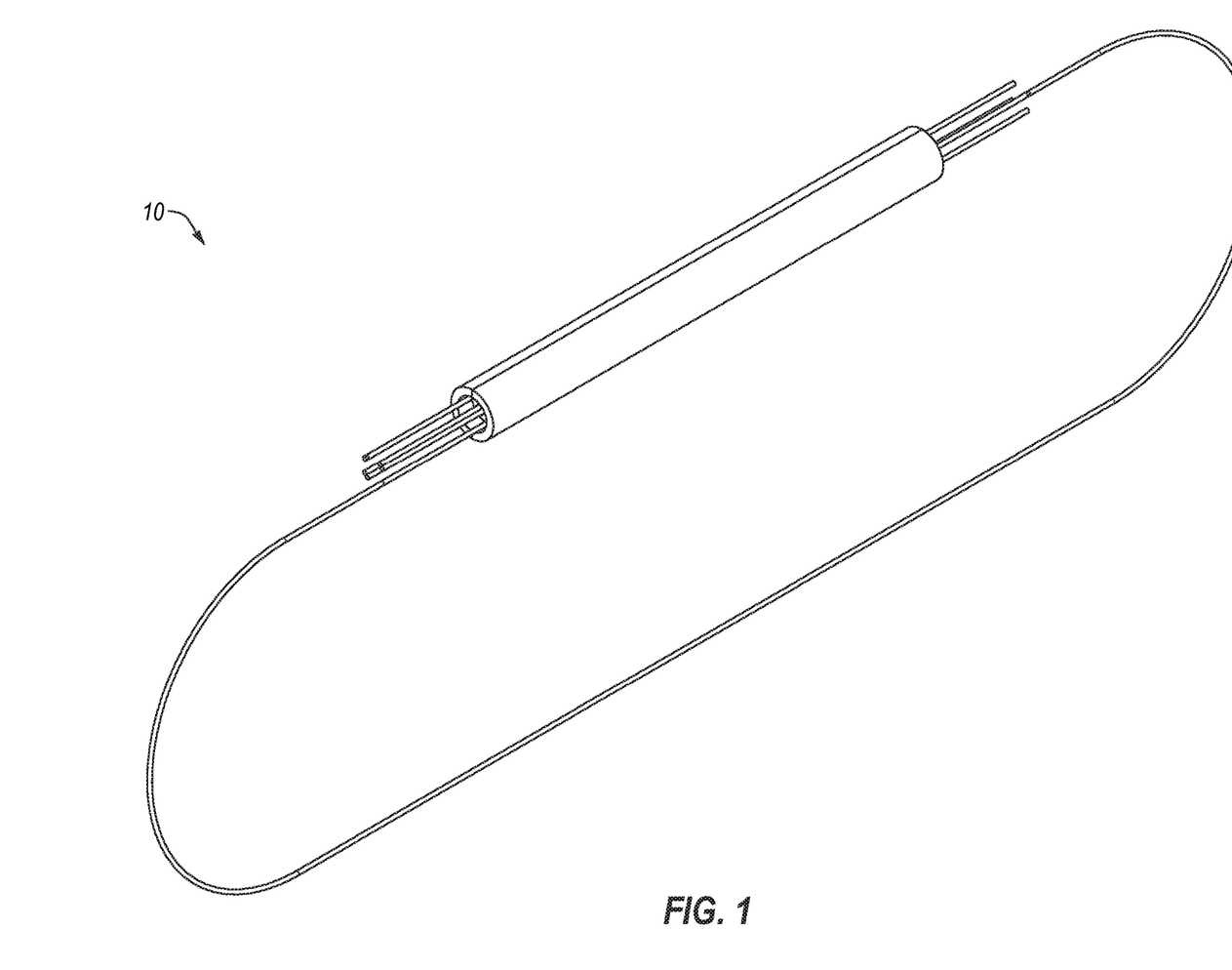
FIG. 1 is a perspective view of an optical component array device.
Figure 2:
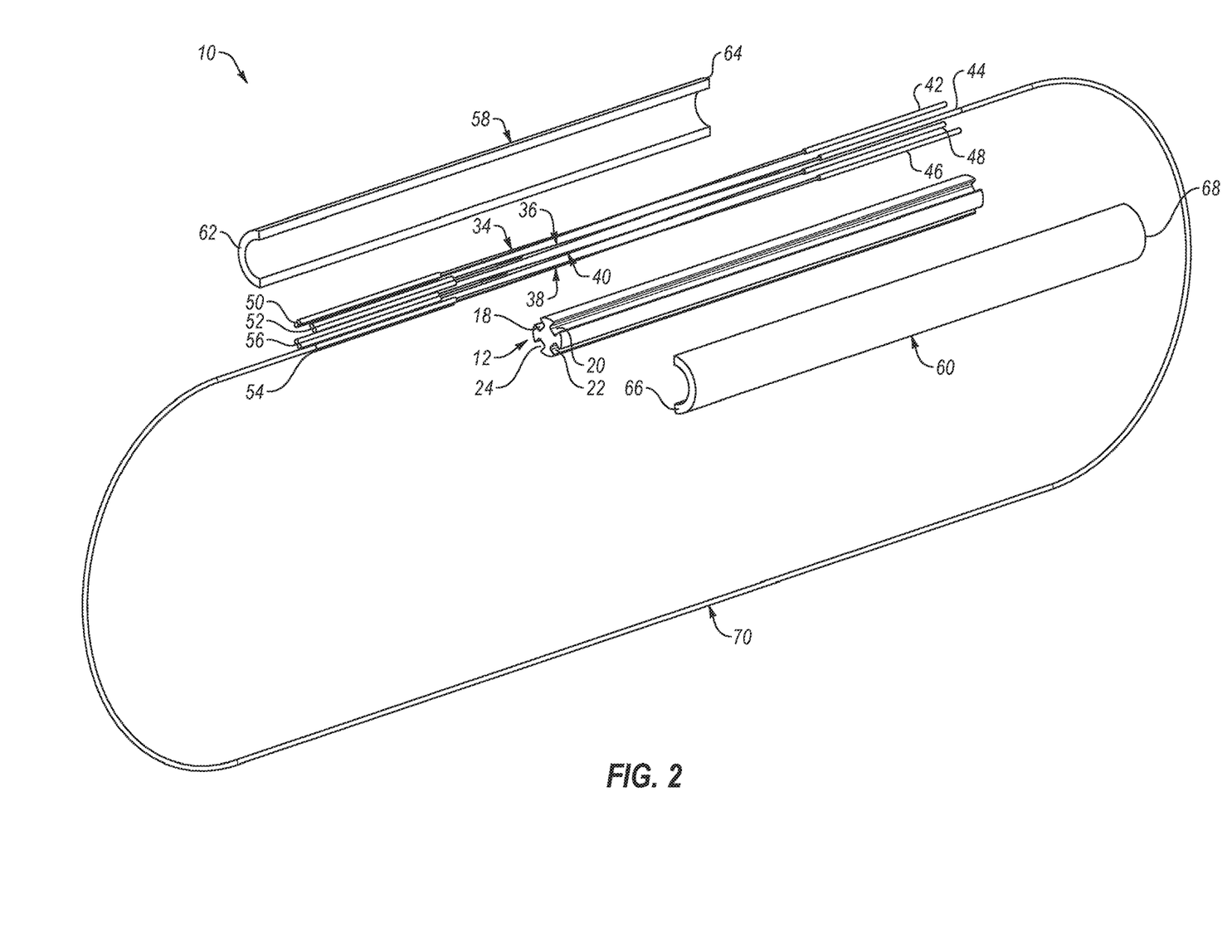
FIG. 2 is a perspective, exploded view of the optical component array device of FIG. 1.
Figure 3:
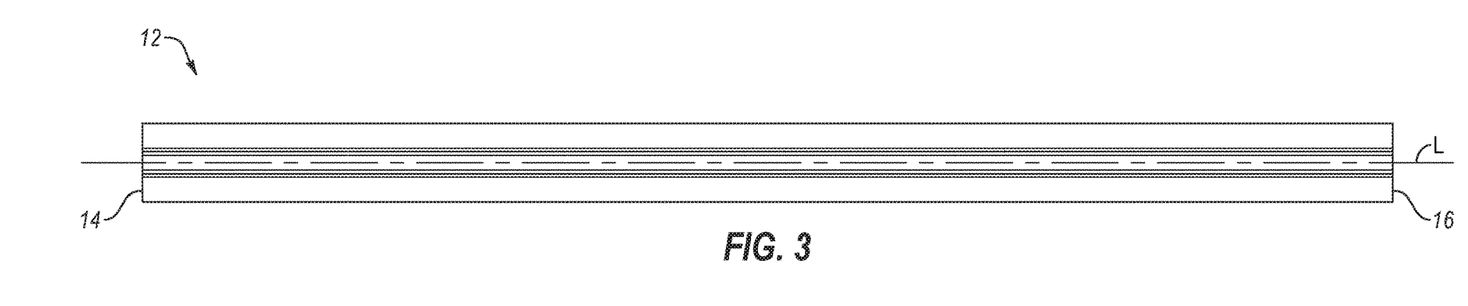
FIG. 3 is a plan view of an elongate body of the optical component array device of FIG. 1 including a plurality of receptacles for receiving optical components.
Figure 4:
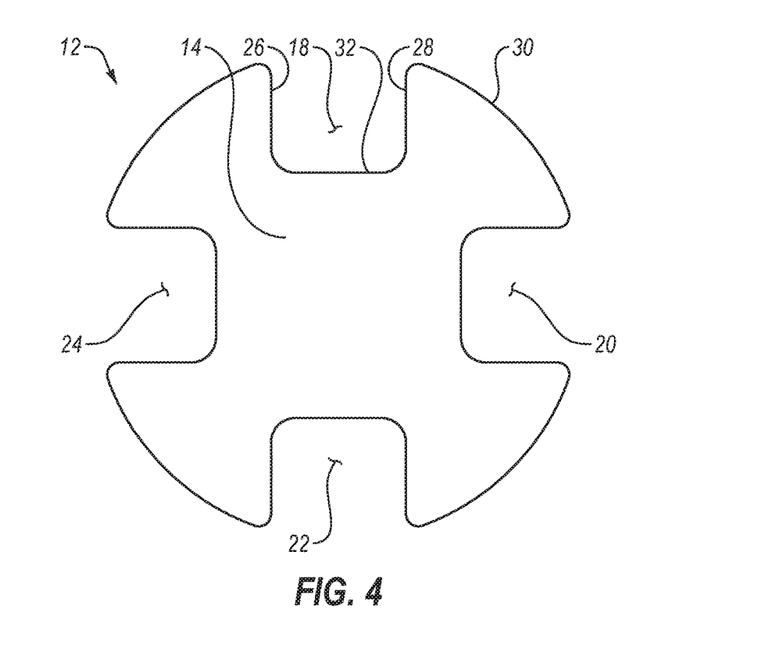
FIG. 4 is an end view of the elongate body illustrated in FIG. 3.

Device 10 further includes a pair of covers 58 and 60 which cooperate to receive and enclose body 12 and a portion of optical components 34, 36, 38 and 40. In the illustrated form, covers 58 and 60 have an arcuate configuration which corresponds to the cylindrical shape of body 12. The shape and configuration of covers 58 and 60 may change as the shape and configuration of body 12 changes. Cover 58 extends between a first end 62 and an opposite second end 64, and cover 60 extends between a first end 66 and an opposite second end 68. Each of covers 58 and 60 includes a length between first ends 62, 66 and second ends 64, 68 which is greater than a length of body 12 between first end 14 and second end 16. As such, when covers 58 and 60 are positioned about body 12, first end 14 of body 12 is inwardly offset from first ends 62 and 66 of covers 58 and 60, respectively, and second end 16 of body 12 is inwardly offset from second ends 64 and 68 of covers 58 and 60, respectively. However, as may be best viewed in connection with FIG. 1 for example, input ends 42, 44, 46, and 48 and output ends 50, 52, 54, and 56 extend past first ends 62 and 66 and second ends 64 and 68 of covers 58 and 60, respectively.

Optical components 34, 36, 38 and 40 may be secured in receptacles 18, 20, 22 and 24 with an adhesive material which may, for example, also be used to secure covers 58 and 60 to body 12. In one form, the adhesive material may be placed in and at least partially fill receptacles 18, 20, 22 and 24 after optical components 34, 36, 38 and 40 have been suitably positioned, followed by the positioning of covers 58 and 60 to environmentally or hermetically seal body 12 and the portions of optical components 34, 36, 38 and 40 positioned therein. However, forms in which receptacles 18, 20, 22 and 24 are not entirely filled with the adhesive material are also possible. In some forms the adhesive material used in connection with device 10 may be an epoxy material.

Device 10 also includes a recursive fiber 70 which extends from an output of output end 54 of optical component 38 to an input of input end 44 of optical component 36. In this arrangement, sequential component such as optical component 38 and optical component 36 may be concatenated without fusion splicing since fiber 70 couples the output of one optical component with the input of another optical component. Amongst other things, elimination of fusion splicing between optical component 38 and optical component 36 may increase reliability, minimize the relevant optical path length, and decrease manufacturing complexity. Forms in which recursive fiber 70 is not present are also possible, as well as forms where a recursive fiber extends between other optical components of device 10.

Figure 5:
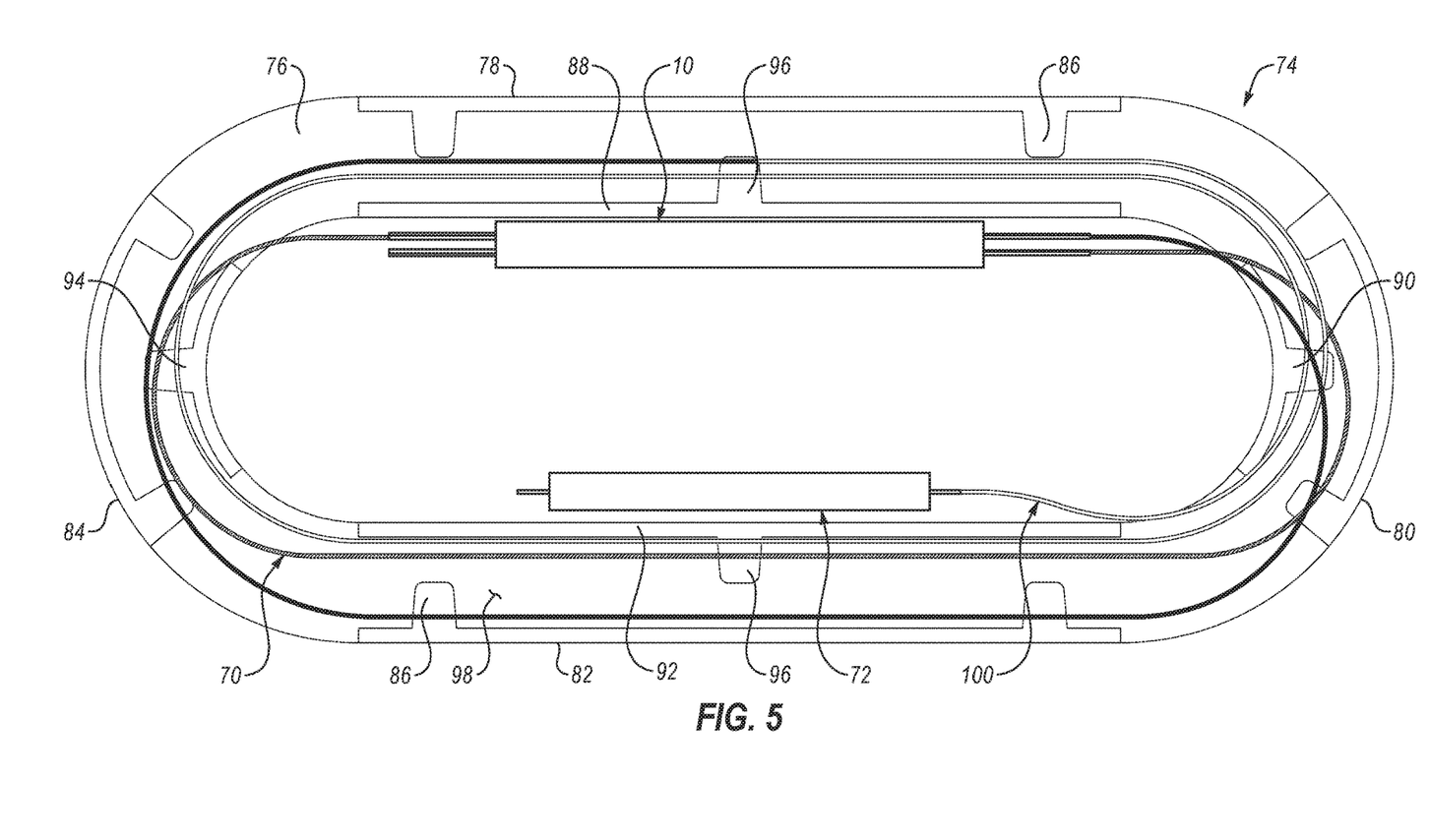
FIG. 5 is a plan view of the optical array device of FIG. 1 positioned relative to an optical fiber routing member and a single optical component.

In FIG. 5, optical component array device 10 is positioned relative to a single optical component 72 and an optical fiber routing member 74 which may be used to route various optical fibers associated with device 10, optical component 72, and any other components which may be present. Routing member 74 includes a base 76 which may be mounted to a PCB of, for example, an optoelectronic module. A plurality of outer guides 78, 80, 82, and 84 extend from base 76 and include inwardly extending tabs 86, only a few of which have been identified in FIG. 5 to preserve clarity. A plurality of inner guides 88, 90, 92, and 94 also extend from base 76 and include outwardly extending tabs 96, only a few of which have been identified in FIG. 5 to preserve clarity. Outer guides 78, 80, 82, and 84 cooperate with inner guides 88, 90, 92, and 94 to define a pathway 98 in which optical fibers may be routed and organized.

For example, recursive fiber 70, which extends between output and input ends of different optical components of device 10, enters pathway 98 through a space between inner guides 88 and 94 and continues in a counter clockwise direction in pathway 98 until it exits through a space between inner guides 88 and 90. In this arrangement, recursive fiber 70 is able to connect between different optical components of device 10 while continuing in pathway 98 for less than one entire loop. A second optical fiber 100 extends between optical component 72 and one of the optical components of device 10 and may, for example, include one or more splices positioned therein. Optical fiber 100 enters pathway 98 through a space between inner guides 90 and 92 and continues for two loops around pathway 98 until it exits through a space between inner guides 88 and 90.

Tabs 86, 96 may engage with and prevent recursive fiber 70, optical fiber 100, and any other optical fibers which may be present from being displaced from pathway 98. Additionally, a number of spaces exist between outer guides 78, 80, 82 and 84 such that optical fibers in pathway 98 could also extend to other components which are not positioned within routing member 74.

Turning now generally to FIGS. 6-10, details regarding an alternative embodiment optical component array device 110 will be provided. As will be descried in greater detail below, device 110 houses and provides a lateral or linear array of a plurality of optical components which may, for example, be fused fiber optical components. Device 110 includes an elongate body 112 which generally has a rectangular configuration and extends along a longitudinal axis L between a first end 114 and an opposite second end 116 and laterally between a first side 115 and a second side 117 of body 112. Body 112 includes a plurality of receptacles 118*a-i* each laterally spaced from one another and configured to receive an optical component. Each of receptacles 118*a-i*, as viewed from first end 114 of body 112 for example, may be formed as a groove in surface 113 of body 112 and includes a modified V-shaped configuration. More particularly, as illustrated with reference to receptacle 118*a* to preserve clarity in FIG. 10, receptacles 118*a-i* include a first surface 120 positioned opposite of a second surface 122 which generally extends transversely to first surface 120. A third surface 124 extends between and transversely to first surface 120 and second surface 122. One or more of receptacles 118*a-i* may also have, for example, a U-shaped or C-shaped configuration, just to provide a few examples.

Body 112 includes a surface 126 which is recessed relative to surface 113 of body 112 and to surface 124 of receptacles 118*a-i* and separates receptacles 118*a-i* into separate portions positioned adjacent to first end 114 and second end 116 of body 112. As indicated above, oreceptacles 118*a-i* are spaced apart from one another and, as may be best seen in FIG. 10 for example, a ridge 127 is positioned between adjacent ones of receptacles 118*a-i*. Only a few ridges 127 have been identified in FIG. 10 to preserve clarity. In addition to being spaced from one receptacles 118*a-i* are spaced laterally across body 112 relative to longitudinal axis L such that receptacles 118*a-i* are arranged in a lateral array on body 112. Generally speaking, receptacles 118*a-i* are evenly spaced from one another, although forms in which the spacing between receptacles 118*a-i* varies are also possible. Body 112 may include one or more less, or additional, receptacles relative to the illustrated form.

Device 110 includes optical components 128, 130, 132, 134, 136, and 138 which are positioned in receptacles 118*a*, 118*b*, 118*c*, 118*e*, 118*h* and 118*i*, respectively. While an optical component is not positioned in receptacles 118*d*, 118*f* and 118*g*, forms where an optical component is also positioned in one or more of receptacles 118*d*, 118*f* and 118*g* are possible. Optical components 128, 130, 132, 134, 136, and 138 respectively include input ends 140, 142, 144, 146, 148 and 150, and output ends 152, 154, 156, 158, 160, and 162. In the illustrated form, each of output ends 154, 158 and 162 includes a pair of outputs which may be coupled to a respective optical fiber, although it is also possible that one or more of output ends 154, 158 and 162 may include a single output which may be coupled to a respective optical fiber. Similarly, while output ends 152, 156 and 160 include a single output, one or more of output ends 152, 156 and 160 may include a pair of outputs which may be coupled to a respective optical fiber. Moreover, while each of input ends 140, 144 and 148 includes a pair of inputs, one or more of input ends 140, 144 and 148 may include a single input which may be coupled to a respective optical fiber, and while each of input ends 142, 146 and 150 includes a single input, one or more of input ends 140, 144 and 148 may include a pair of inputs.

When optical components 128, 130, 132, 134, 136 and 138, or any other optical components which may be present, are positioned in receptacles 118a, 118b, 118c, 118e, 118h and 118i, or another combination of receptacles, of body 112, input ends 140, 142, 144, 146, 148 and 150 extend past second end 116 of body 112, and output ends 152, 154, 156, 158, 160, and 162 extend past first end 114 of body 112. In some forms, one or more or each of optical components 128, 130, 132, 134, 136 and 138, or a different number of optical components, may be a fused fiber optical component which includes a fused fiber coupling region where light may be exchanged between optical fibers. In these forms, the fused fiber coupling region may be positioned in receptacles 118a, 118b, 118c, 118e, 118h and 118i, or a different combination of receptacles, between first end 114 and second end 116 of body 112. In one form for example, the fused fiber coupling region may be positioned along or over surface 126 of elongate body 112.

Figure 6:
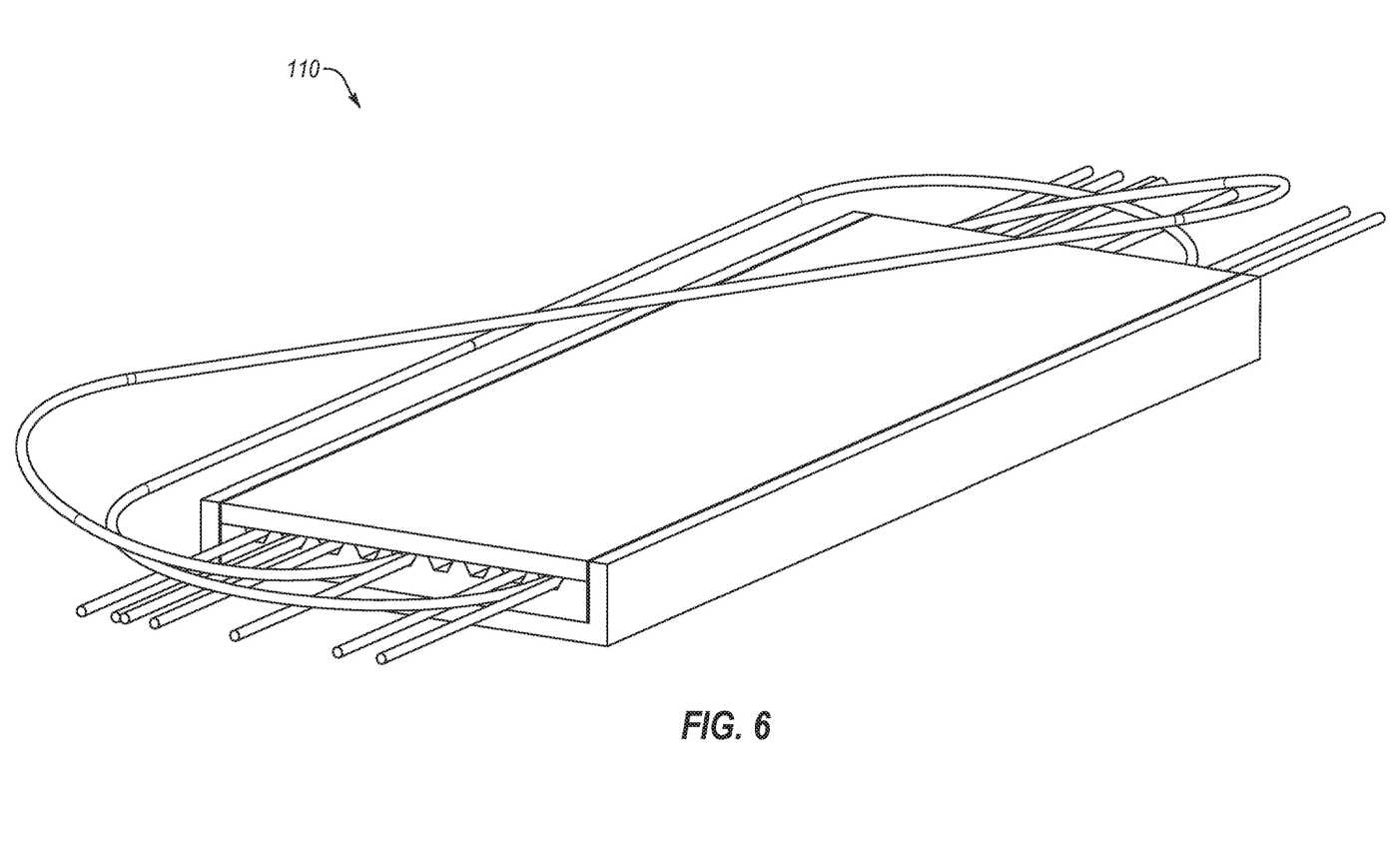
FIG. 6 is a perspective view of an alternative embodiment optical component array device.
Figure 7:
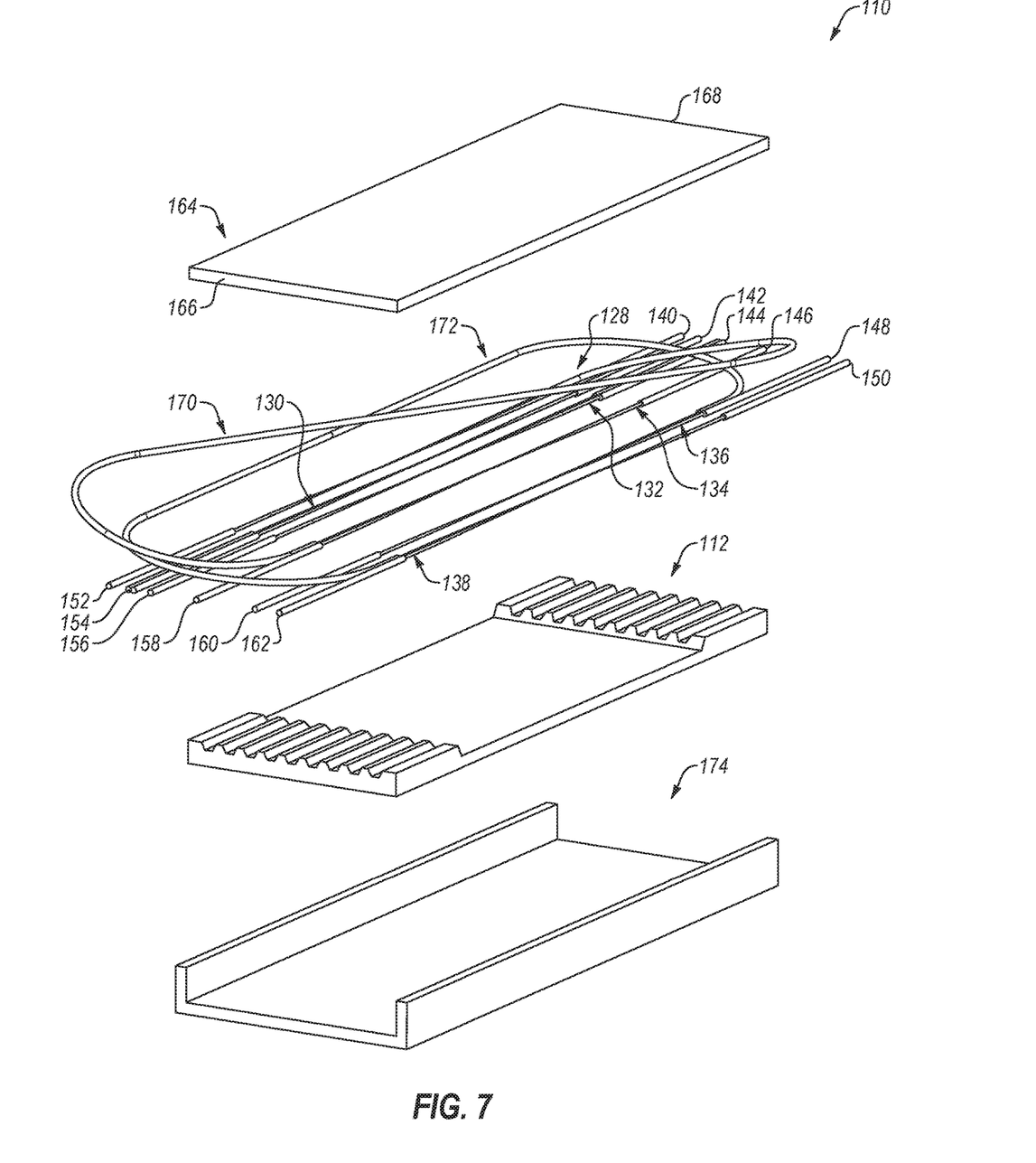
FIG. 7 is a perspective, exploded view of the optical component array device of FIG. 6.
Figure 8:
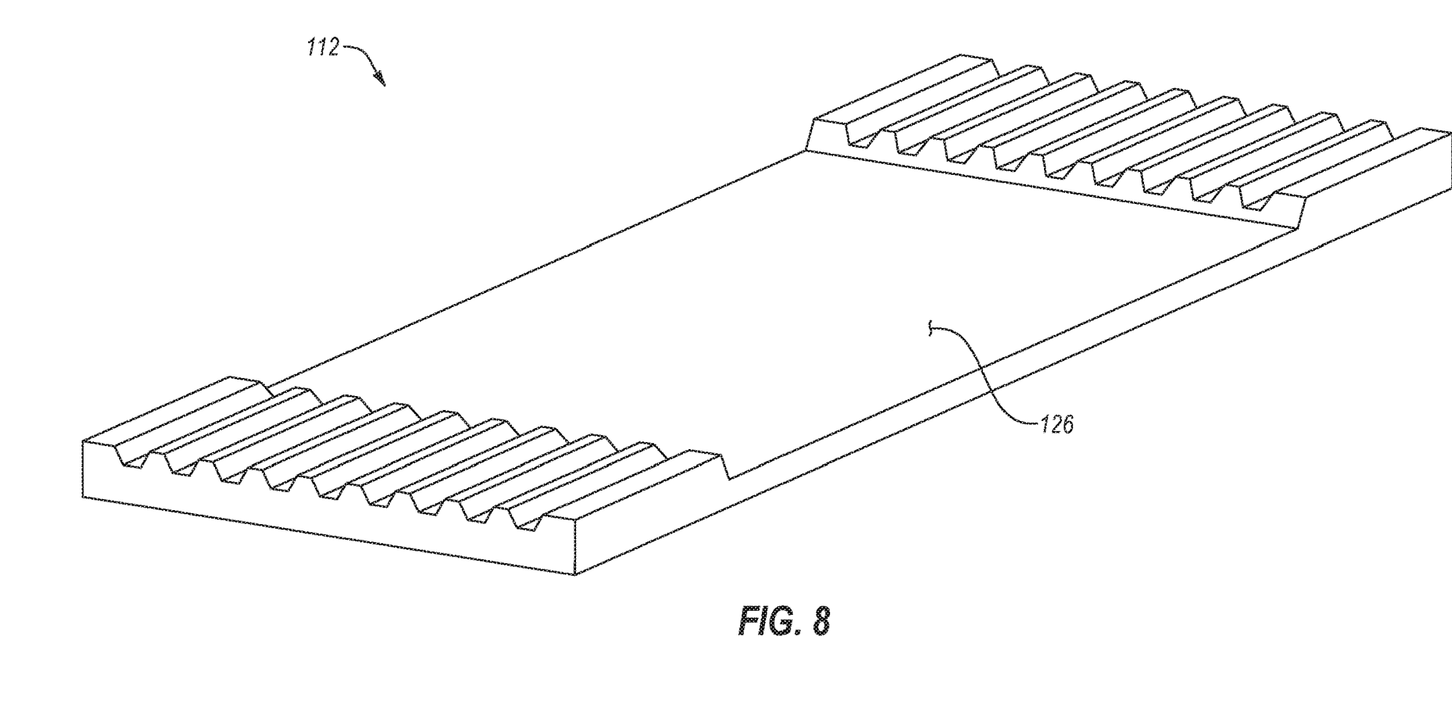
FIG. 8 is perspective view of an elongate body of the optical component array device of FIG. 6 including a plurality of receptacles for receiving optical components.
Figure 9:
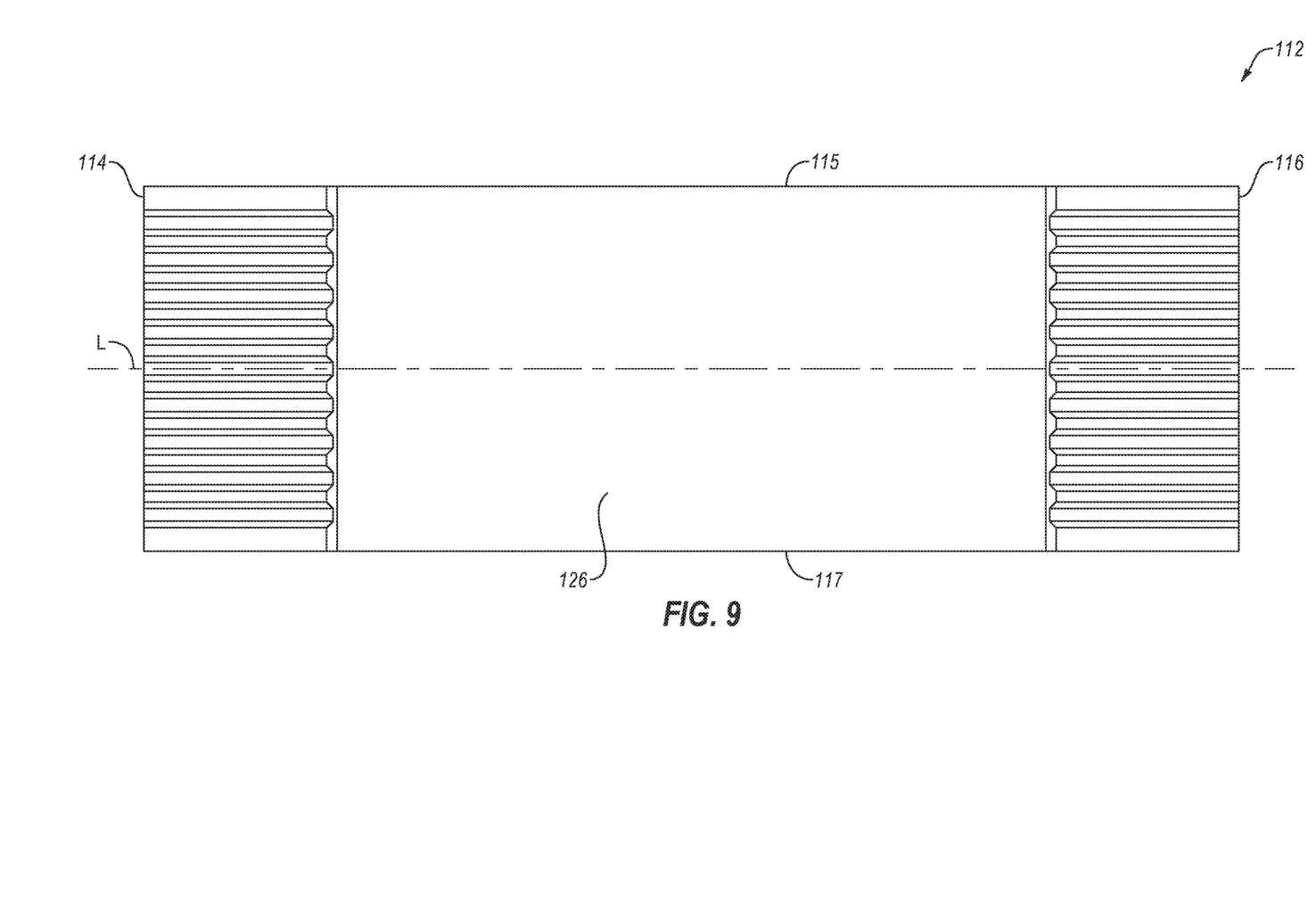
FIG. 9 is a plan view of the elongate body illustrated in FIG. 8.
Figure 10:
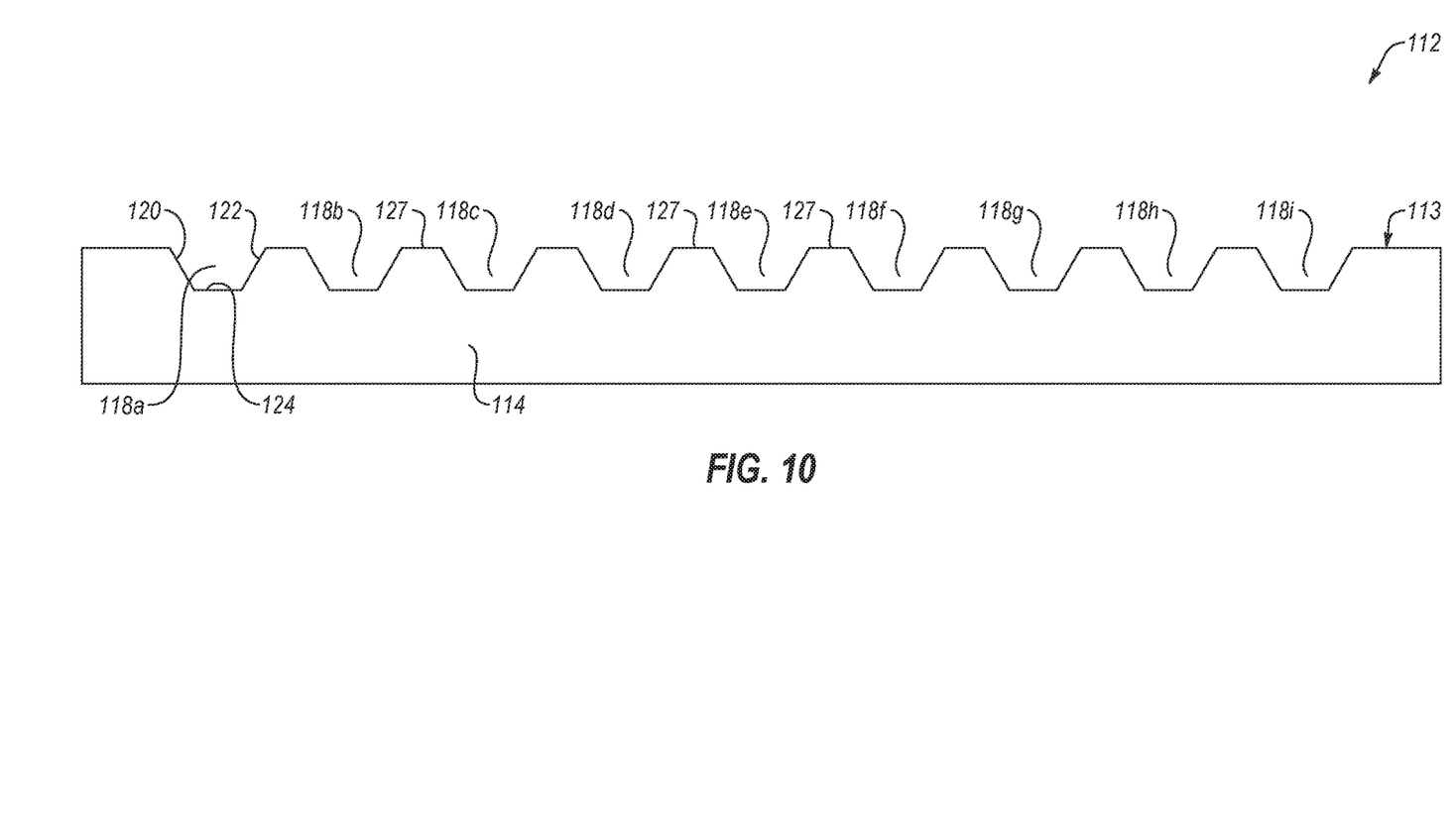
FIG. 10 is an end view of the elongate body illustrated in FIG. 8.

Device 110 further includes a cover 164 which is positioned over elongate body 112 and retains optical components in 128, 130, 132, 134, 136 and 138, or other optical components which may be present, in receptacles 118a, 118b, 118c, 118e, 118h and 118i, or some other combination of receptacles 118a-i as relevant depending on the number and positioning of the optical components which are present. In the illustrated form, cover 164 has a rectangular configuration which generally corresponds in size and shape to elongate body 112. The shape and configuration of cover 164 may change as the shape and configuration of elongate body 112 changes.

When positioned over elongate body 112, first end 166 and second end 168 of cover 164 are generally flush or in-line with first end 114 and second end 116, respectively, of elongate body 12. In this configuration, input ends 140, 142, 144, 146, 148 and 150 extend past second end 168 of cover 164, and output ends 152, 154, 156, 158, 160, and 162 extend past first end 166 of ccover 164. In some forms, cover 164 may be longer that elongate body 112 such that first end 114 of elongate body 112 is inwardly offset from first end 166 of cover 164 and second end 116 of elongate body 112 is inwardly offset from second end 168 of cover 164.

Optical components 128, 130, 132, 134, 136 and 138, or other optical components which may be present, may be secured in receptacles 118a, 118b, 118c, 118e, 118h and 118i, or some other combination of receptacles 118a-i, with an adhesive material which may, for example, also be used to secure cover 164 to elongate body 112. In one form, after optical components have been suitably positioned in those of receptacles 118a-i which will receive an optical component, the adhesive material may be placed in and at least partially fill one or more of receptacles 118a-118i, as well as recessed surface 126, and then cover 164 may be positioned over elongate body 112 to environmentally or hermetically seal elongate body 112 and the portions of optical components 128, 130, 132, 134, 136 and 138, or other optical components which may be present, positioned therein. Forms in which one or more of receptacles 118a-i and recessed surface 126 are not entirely filled with the adhesive material are also possible. Device 110 also includes a tray 174 in which elongate body 112 and cover 164 may be positioned and retained with an adhesive material. The portion of tray 174 opposite of cover 164 may, in turn, be adhered or otherwise coupled to a PCB or other component of an optoelectronic module. In some forms the adhesive materials used in connection with device 110 may be epoxy materials.

Device 110 also includes a recursive fiber 170 which extends from an output of output end 158 of optical component 134 to an input of input end 140 of optical component 128, and a recursive fiber 172 which extends from an output of output end 162 of optical component 138 to an input of input end 148 of optical component 136. In this arrangement, sequential components such as optical component 134 and optical component 128, and optical component 138 and optical component 136, may be concatenated without fusion splicing since fibers 170 and 172 respectively couple the output of one optical component with the input of another optical component. As indicated above, elimination of fusion splicing between various optical components may, amongst other things, increase reliability, minimize relevant optical path lengths, and decrease manufacturing complexity. Forms in which one or both of recursive fibers 170 and 172 are not present are also possible, as well as forms where a recursive fiber extends between other optical components of device 110.

Figure 11:
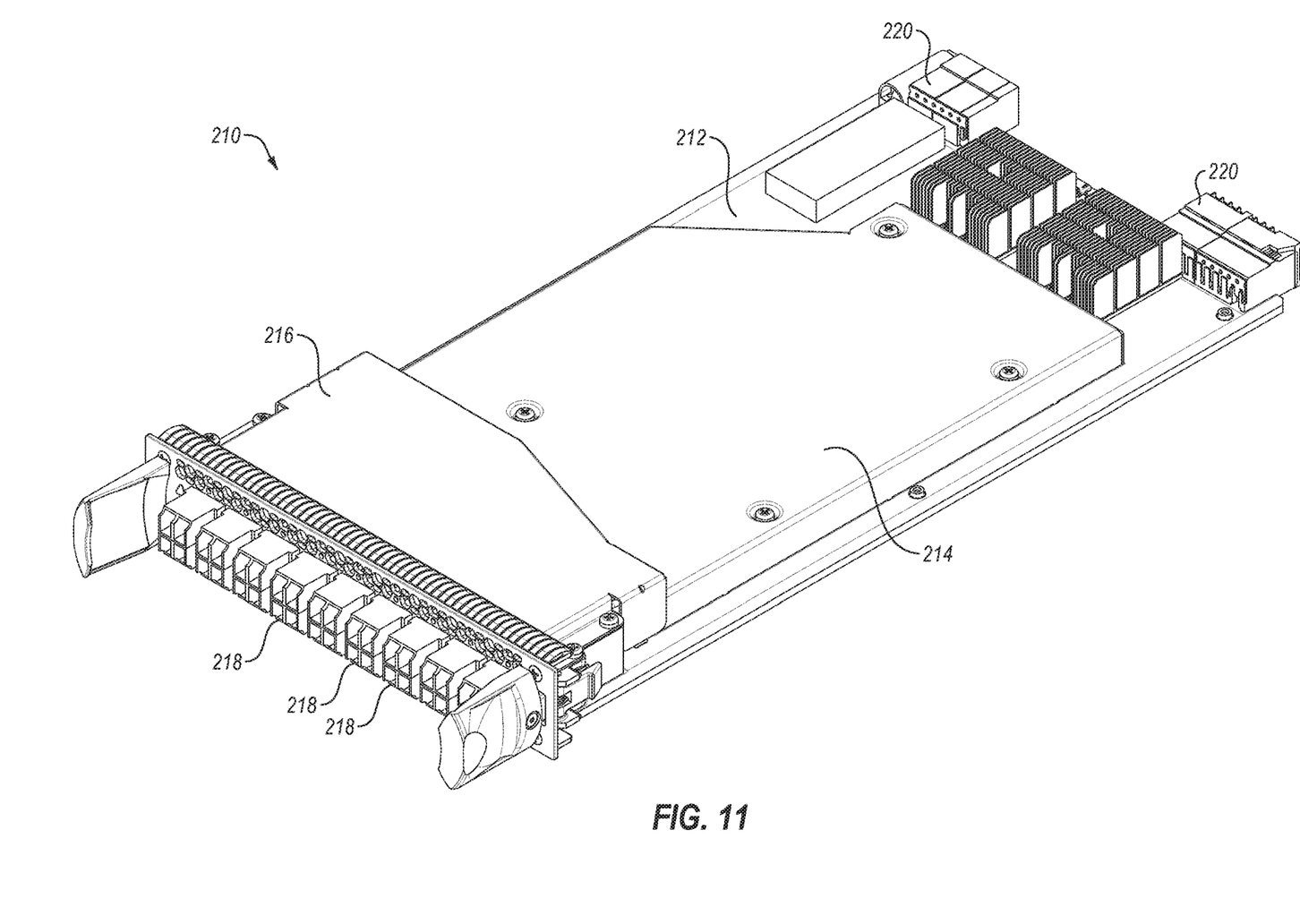
FIG. 11 is a perspective view of a communication module.

Devices 10 and 110 may be used in any number or variety of communication or optoelectronic modules. In some forms, the modules in which devices 10 and 110 may be used include a relatively large number of optical components. One example of a module of this nature may be an optical or amplifier line card, including for example line card 210 illustrated in FIGS. 11-13. Line card 210 includes a PCB 212 having covers 214 and 216 coupled therewith and housing a variety of components coupled to or otherwise arranged relative to PCB 212. Line card 210 may also include a housing (not shown) which houses PCB 212 while still providing access to ports or connectors 218 and 220 (only a few of which have been identified to preserve clarity) positioned at opposite ends of PCB 212. By way of example, connectors 218 and 220 may be optical or electrical connectors.

Figure 12:
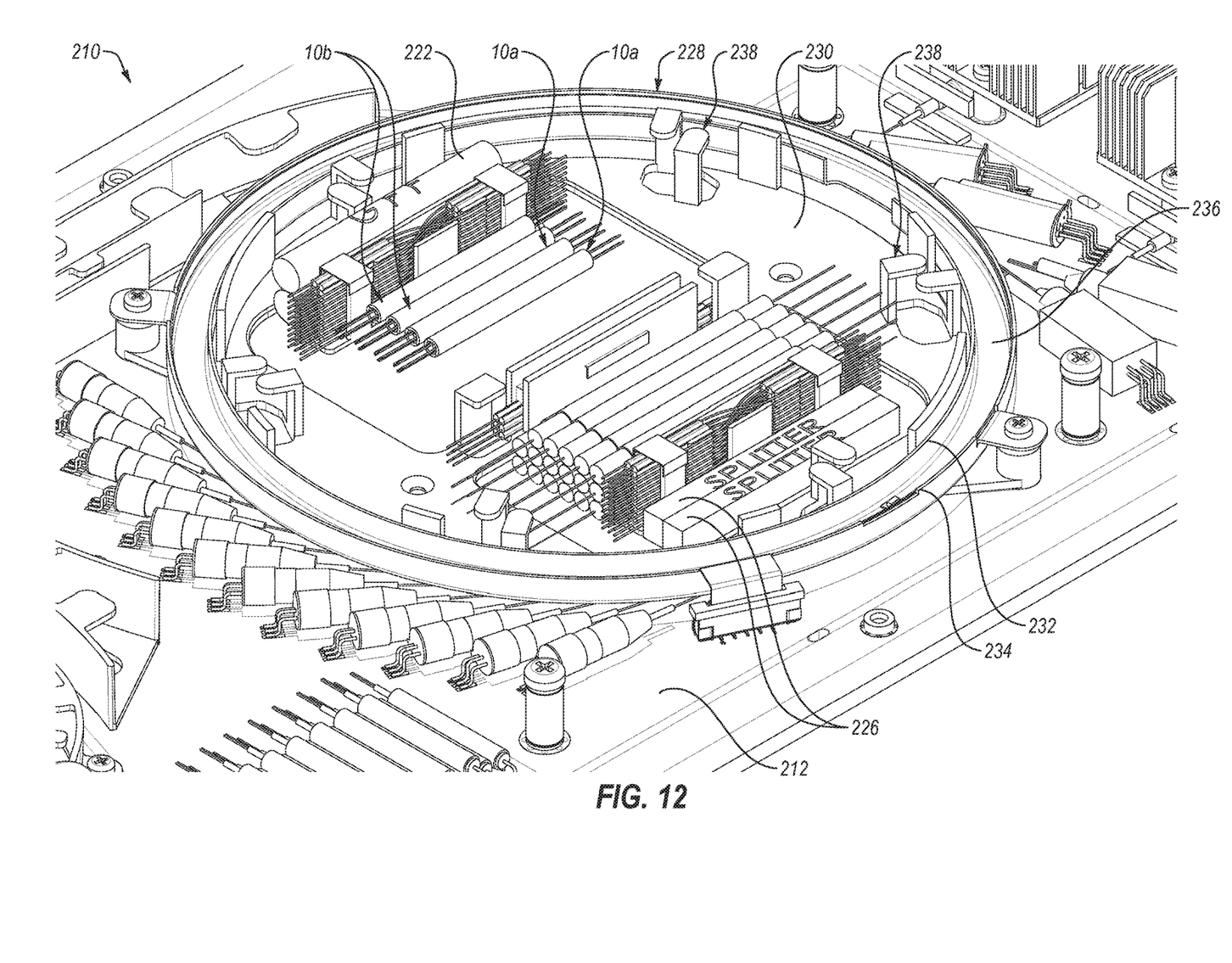
FIG. 12 is an enlarged, perspective view of a portion of the communication module of FIG. 11 including a plurality of the optical component array devices illustrated in FIGS. 1-4.

In FIG. 12, where covers 214 and 216 have been removed from line card 210 and an enlarged perspective view of a portion of line card 210 is illustrated, it can be seen that line card 210 includes a number of optical components positioned relative to PCB 212. For example, amongst other components, line card 210 includes a pair of gain flattening filters 222, a number of couplers 224, and a number of splitters 226, each of which is positioned inside of an optical fiber routing member 228 which may be used to route various optical fibers (not shown) associated with optical components of line card 210. Routing member 228 includes a base 230 which may be mounted on or coupled with PCB 212. Routing member 228 also includes an inner track or guide 232 and an outer track or guide 234 which extend from base 230 in a direction away from PCB 212 and cooperate to define a circular pathway 236 in which optical fibers may be routed and organized. A plurality of guides 238, only a few of which have been identified to preserve clarity, also extend from base 230 in a direction away from PCB and are positioned inwardly of inner guide 232 and are further configured for routing and organizing one or more optical fibers.

Figure 13:
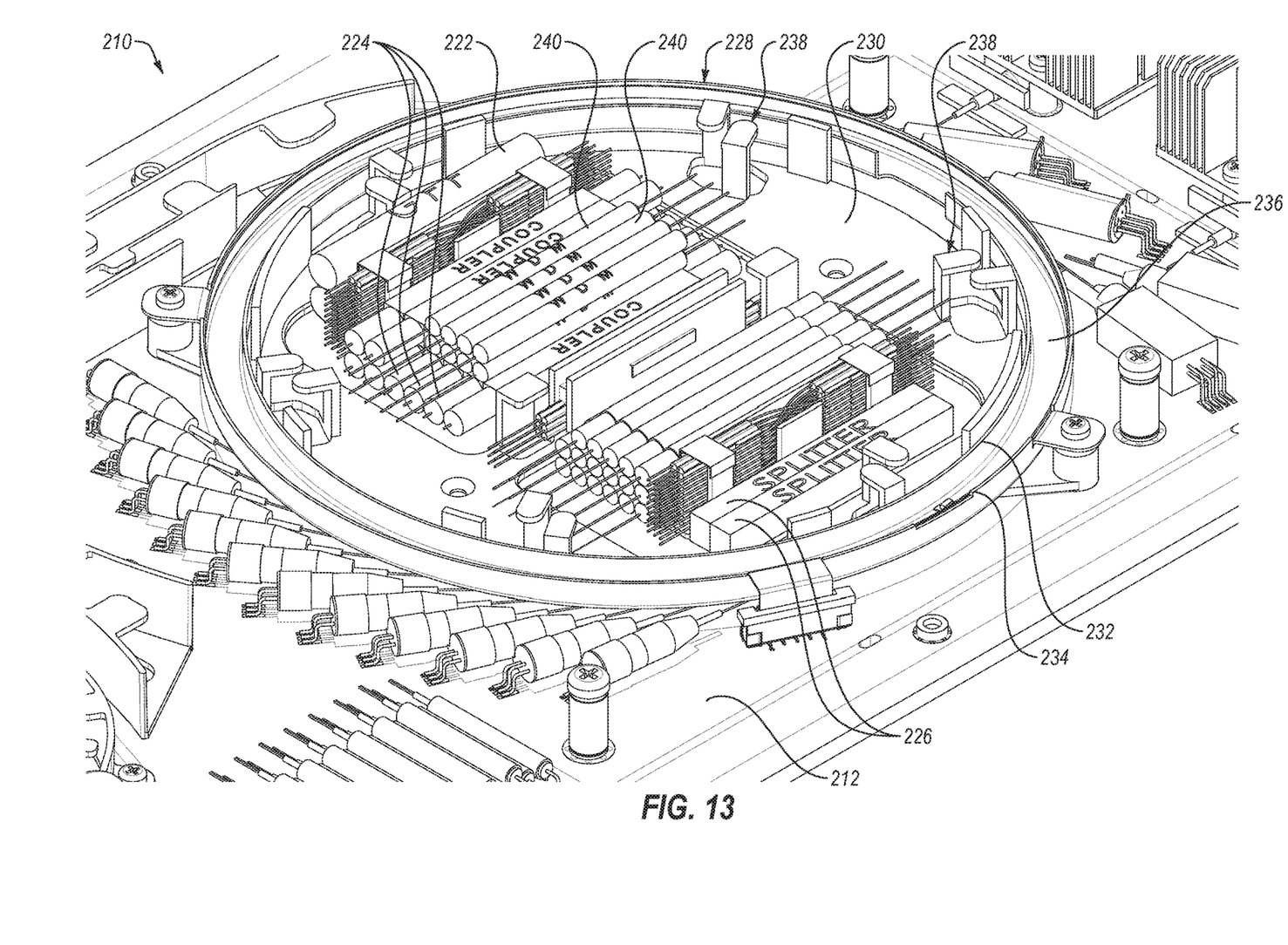
FIG. 13 is an enlarged, perspective view of a portion of the communication module of FIG. 11 including a plurality of single optical components in place of the optical component array devices as illustrated in FIG. 12.

Line card 210 also includes a plurality of optical component array devices 10 with optical component array devices 10a positioned adjacent to optical component array devices 10b. Each of devices 10a houses and provides four fused fiber optical components in the form of wavelength division multiplexers, and each of devices 10b houses and provides four fused fiber optical components in the form of couplers. The number of devices 10 present and the fiber optic component functionality provided thereby in the illustrated form are representative only, and variations in both the number and functionality of devices 10, and the number of optical components included by both, may vary in alternative forms. By way of example, line card 210 as illustrated in FIG. 13 also includes eight fused fiber optical components in the form of wavelength division multiplexers 240, only a few of which have been identified to preserve clarity, and eight fused fiber optical components in the form of couplers 224, only a few of which have been identified to preserve clarity. However, in contrast to the form illustrated in FIG. 12, each of wavelength division multiplexers 240 is provided as a single stand-alone component having relatively the same size as each of devices 10, and each of couplers 224 is provided as a single stand-alone component having relatively the same size as each of devices 10*b*, thus resulting in an increased total volume consumed by the optical components relative to the form shown in FIG. 12. To further reduce the total volume consumed by optical components, line card 210 may also utilize an optical component array device 110 which replaces the eight couplers 224 shown in the illustrated form.

Optical components described herein which may be included in device 10 or device 110 may be provided in any of a number of different forms and with any of a number of different functionalities. The optical components may each individually perform a single function which may be the same or different from the function performed by the other optical components. The optical components may therefore collectively perform a single function or multiple different functions. In one aspect, one or more of the optical components of device 10 or device 110 may be a fused fiber optical component. Particular forms of the optical components which may be included in device 10 or device 110 include tap couplers and wavelength division multiplexers, just to provide a few examples. Device 10 or device 110 may also include in one or more receptacles thereof a fusion splice between similar or dissimilar types or diameters of optical fibers.

In one aspect, the optical components which may be included in device 10 or device 110 include fused fiber optical components where bare fibers are epoxied into slotted glass rods and further protected by a concentric layer of shrink tubing. Similarly, it is contemplated that one or more of the optical components included in device 10 or device 110 may have this configuration as it is positioned in a relevant receptacle of one or more of these devices and subsequently covered with an epoxy material. The optical components in device 10 or device 110 may all have the same functionality within a given device 10 or 110, or the functionality of different components within a given device 10 or 110 may vary such that device 10 or device 110 provide multiple different functionalities which may, for example, be complementary to one another.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module, comprising:
a printed circuit board ("PCB") that extends between opposite ends and includes one or more electrical or optical connectors at one or both ends thereof; and
an optical component array device that includes an elongate body configured to position a plurality of fused fiber optical components relative to the PCB in an array of laterally or radially spaced receptacles along a longitudinal axis of the elongate body,
wherein at least one of the receptacles includes an elongate opening sized to receive at least one of the plurality of fused fiber optical components, and the at least one of the receptables opens through a surface of the elongate body along the longitudinal axis.

2. The optoelectronic module of claim 1, further comprising an optical fiber routing member coupled to the PCB, wherein the routing member includes a plurality of guides that extend away from the PCB and that define a pathway to route optical fibers relative to the PCB.

3. The optoelectronic module of claim 1, wherein the elongate body of the optical component array device includes an elongated cylindrical body that extends between a first end and an opposite second end of the elongated cylindrical body; and wherein the receptacles are radially spaced around an outer circumference of the elongated cylindrical body.

4. The optoelectronic module of claim 3, wherein each of the receptacles extends between and opens at the first end and the second end of the elongated cylindrical body.

5. The optoelectronic module of claim 4, wherein the elongate opening extends between the first end and the second end of the elongated cylindrical body.

6. The optoelectronic module of claim 3, wherein the optical component array device further includes a cylindrical cover positioned around the elongated cylindrical body.

7. The optoelectronic module of claim 1, wherein the elongate body extends between a first end and an opposite second end of the elongate body; and wherein the receptacles are laterally spaced between opposite sides of the elongate body.

8. The optoelectronic module of claim 7, wherein each of the receptacles includes a first portion positioned adjacent the first end of the elongate body and a second portion spaced from the first portion and positioned adjacent to the second end of the elongate body.

9. The optoelectronic module of claim 8, wherein the elongate body includes a recessed portion positioned between the first and second portions of the receptacles.

10. The optoelectronic module of claim 7, wherein the optical component array device further includes a cover positioned over the receptacles and the fused fiber optical components, and a tray in which the elongate body is positioned.

11. The optoelectronic module of claim 1,
wherein the elongate body includes an elongated cylindrical body that extends between a first end and an opposite second end; and
wherein the array of laterally or radially spaced receptacles includes a plurality of receptacles radially spaced around an outer circumference of the elongated cylindrical body,
wherein one or more of the receptacles is defined by an elongate slot that extends between and opens at the first and second ends of the elongated cylindrical body; and
wherein one of the receptacles is configured to receive a first one of the fused fiber optical components.

12. The optoelectronic module of claim 11, wherein each of the plurality of receptacles is configured to receive a corresponding one of the fused fiber optical components.

13. The optoelectronic module of claim 12, further comprising a cover that encloses the elongated cylindrical body.

14. The optoelectronic module of claim 12, further comprising a recursive fiber that extends between an output of the first fused fiber optical component and an input of a second one of the fused fiber optical components.

15. The optoelectronic module of claim 1,
wherein the elongate body extends along a longitudinal axis between a first end and an opposite second end of the elongate body and laterally between a first side and an oppositely positioned second side of the elongate body;
wherein the array of laterally or radially spaced receptacles includes a plurality of receptacles laterally spaced from one another and positioned between the first and second sides of the elongate body,
wherein one of the receptacles is configured to receive a fused fiber optical component; and
wherein the elongate body includes a cover member positioned over the elongate body and configured to cooperate with the elongate body to receive therebetween a first of the fused fiber optical components.

16. The optoelectronic module of claim 15, wherein the plurality of receptacles are defined by a plurality of grooves formed in the elongate body; and wherein the plurality of grooves extend in-line with the longitudinal axis.

17. The optoelectronic module of claim 16, wherein the grooves include a first portion spaced from a second portion by a recessed surface of the elongate body.

18. The optoelectronic module of claim 15, further comprising a recursive fiber that extends between an output of the first fused fiber optical component and an input of a second one of the fused fiber optical components.

19. An optoelectronic module, comprising:
a printed circuit board ("PCB") that extends between opposite ends and includes one or more electrical or optical connectors at one or both ends thereof; and
an optical component array device that includes an elongate body configured to position a plurality of fused fiber optical components relative to the PCB in an array of laterally or radially spaced receptacles,
wherein the elongate body extends between a first end and an opposite second end of the elongate body; and wherein the receptacles are laterally spaced between opposite sides of the elongate body,
wherein each of the receptacles includes a first portion positioned adjacent the first end of the elongate body and a second portion spaced from the first portion and positioned adjacent to the second end of the elongate body, and
wherein the first and second portions of the receptacles include a modified V-shaped configuration having a first surface, a second surface that extends transversely to the first surface, and a third surface that extends between and transversely to the first surface and the second surface.

20. An optoelectronic module, comprising:
a printed circuit board ("PCB") that extends between opposite ends and includes one or more electrical or optical connectors at one or both ends thereof; and
an optical component array device that includes an elongate body configured to position a plurality of fused fiber optical components relative to the PCB in an array of laterally or radially spaced receptacles,
wherein the optical component array device includes a recursive fiber that extends between an output of a first one of the fused fiber optical components and an input of a second one of the fused fiber optical components.

* * * * *